United States Patent
Gurarslan

(10) Patent No.: US 6,739,460 B2
(45) Date of Patent: May 25, 2004

(54) NON-CONTAMINATING PAINT STRAINER

(75) Inventor: Arman Gurarslan, Montréal (CA)

(73) Assignee: Arslan Automotive Canada Ltd., Montreal (CA)

( * ) Notice: Subject to any disclaimer, the term of this patent is extended or adjusted under 35 U.S.C. 154(b) by 73 days.

(21) Appl. No.: 10/144,704

(22) Filed: May 15, 2002

(65) Prior Publication Data

US 2003/0213743 A1 Nov. 20, 2003

(51) Int. Cl.[7] .................... B01D 29/085; B01D 35/28
(52) U.S. Cl. ............... 210/469; 210/474; 210/497.2; 210/497.3; 210/506
(58) Field of Search ................. 210/469, 473, 210/474, 477, 497.2, 497.3, 506; 55/521; 156/265, 514

(56) References Cited

U.S. PATENT DOCUMENTS 4,064,053 A * 12/1977 Gerson et al. ............ 210/497.2
4,559,140 A * 12/1985 Croteau .................... 210/497.2

* cited by examiner

Primary Examiner—David A. Reifsnyder
(74) Attorney, Agent, or Firm—Ogilvy Renault; Guy J. Houle

(57) ABSTRACT

A non-contaminating paint strainer is comprised of a conical receptacle having a conical tapering side wall. The side wall has an inner surface and an outer surface. The conical receptacle defines a lower filtration portion having an aperture provided with reinforcing ribs formed integral with the side wall and extending into the aperture. A filtration mesh screen is secured to the outer surface of the tapering side wall adjacent the aperture and to an outer surface of the reinforcing ribs by glue applied solely to the outer surface of the side wall and outer surface of the reinforcing rib, whereby paint being filtered by the conical receptacle will be in contact solely with the inner surface, free of the glue. Any ink printing is provided on the outer surface of the conical side wall above the mesh screen.

6 Claims, 3 Drawing Sheets

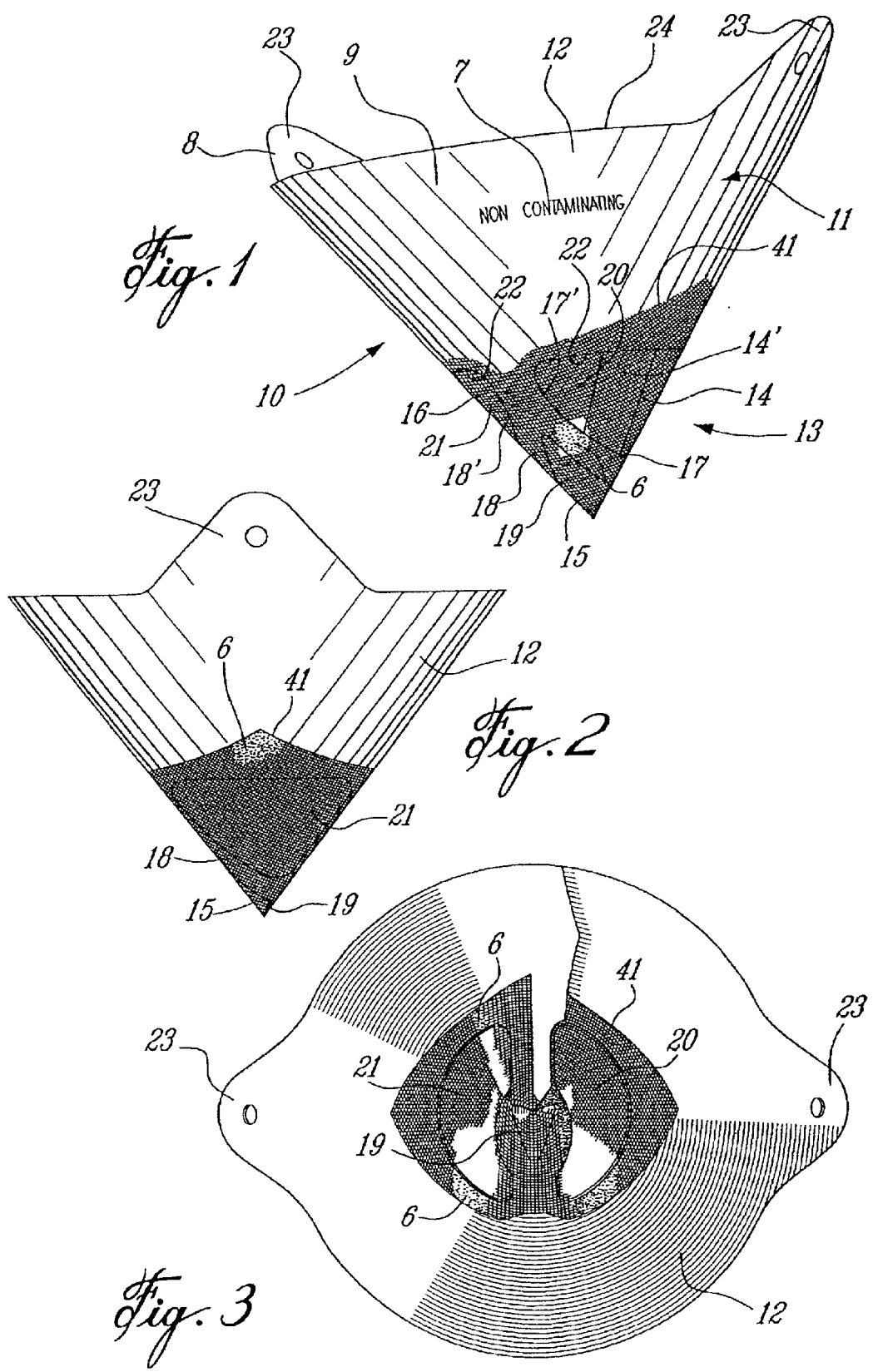

NON-CONTAMINATING PAINT STRAINER

TECHNICAL FIELD

The present invention relates to a non-contaminating paint strainer constructed of paperboard material and its blank wherein the mesh screen is glued to the outer surface of the strainer, whereby paint being filtered by the receptacle will be in contact solely with the inner surface of the strainer, which is free of glue and printed matter.

BACKGROUND ART

In our U.S. Pat. No. 4,559,140, we describe a paint strainer having a reinforced lower filtration aperture. Often, when filtering liquids, such as paint, lumps of paint will lodge themselves against the inner surface of the strainer and cause obstruction to the filtration aperture. Also, the paint strainer can be used for substantially long periods of time when filtering paint from a large can, and this places the paint in contact with the inner surface of the filter and the screen. We have recently discovered that such strainers can contaminate the paints or solvents being filtered, as the glue that is used to glue the screen to the filter, or glue parts of the filter structure, does soften and dissolve into the paint when exposed thereto. This can cause serious problems, depending on the quality and use of such paints or solvents.

Another problem with paint strainers is that many of these are formed of paperboard material and often there is printed material on the inner surface of the filters. The ink pigments also dissolve within the paint and cause contamination.

SUMMARY OF INVENTION

It is therefore a feature of the present invention to provide a non-contaminating paint strainer and its blank and which substantially overcomes the above-mentioned disadvantages of the prior art.

It is a further feature of the present invention to provide a non-contaminating paint strainer wherein the filtration mesh screen is glued to the outer surface of the strainer by a water-base glue.

Another feature of the present invention is to provide a non-contaminating paint strainer wherein any printed material is contained solely on the outer surface of the strainer and wherein the inner surface of the strainer is free of any contaminating substances.

Another feature of the invention is to provide a reinforced rib in the filtration extending to the apex of the cone.

Another feature of the present invention is to provide a paint strainer blank having the above-noted features.

According to the above features, from a broad aspect, the present invention provides a non-contaminating paint strainer which comprises a conical receptacle having a conically tapering side wall. The side wall has an inner surface and an outer surface. The conical receptacle defines an upper support portion having an open end and a lower conical filtration portion. The lower conical filtration portion has an aperture. Rib reinforcing means are formed integral with the side wall and extend into the aperture. A filtration mesh screen surrounds the aperture and is secured to the outer surface of the tapering side wall adjacent the aperture and to an outer surface of the rib reinforcing means by e water-base glue applied solely to the outer surface of the side wall and outer surface of the rib reinforcing means, whereby paint being filtered by the conical receptacle will be in contact solely with the inner surface, which is free of said glue. The rib reinforcing means provides stress distribution and rigidity to the screen in the aperture, and defines a lower conical support for the screen from a top edge of the aperture to a conical tip thereof defined by the rib reinforcing means. The lower conical support defines an apex for the receptacle and provides minimum obstruction to prevent accumulation of paint and obstruction to the mesh screen.

According to a still further broad aspect of the present invention, there is provided a non-contaminating paint strainer blank, which comprises a flat sheet having an inner surface and an outer surface. The flat sheet has opposed side edges and opposed symmetrical end edges and configured to be folded into a conical-shaped strainer. A first one of the side edges has a substantially convex shape in a major central portion thereof. A second one of the side edges is of substantially concave shape in an aligned major central portion. A V-shape cut-out is centrally disposed in the second side edge. A small pointed arm protrudes into the V-shape cut-out adjacent the concave side edge and terminates at its apex on the central transverse axis of the blank. Two large symmetrical apertures are cut out on a respective side of the V-shape cut-out opening and spaced inwardly of the concave side edge and a one-piece filtration mesh screen is glued to the outer surface of the blank by a water-base glue and overlies the two large apertures and a substantial portion of the V-shape cut-out opening.

BRIEF DESCRIPTION OF DRAWINGS

A preferred embodiment of the present invention will now be described with reference to the accompanying drawings in which:

FIG. 1 is a perspective view of the non-contaminating cone-shaped paint strainer of the present invention;

FIG. 2 is a side view of the non-contaminating paint strainer showing the position of the reinforcing arms and apertures;

FIG. 3 is a top view of the non-contaminating conical paint strainer;

DESCRIPTION OF PREFERRED EMBODIMENTS

Figure 4A:
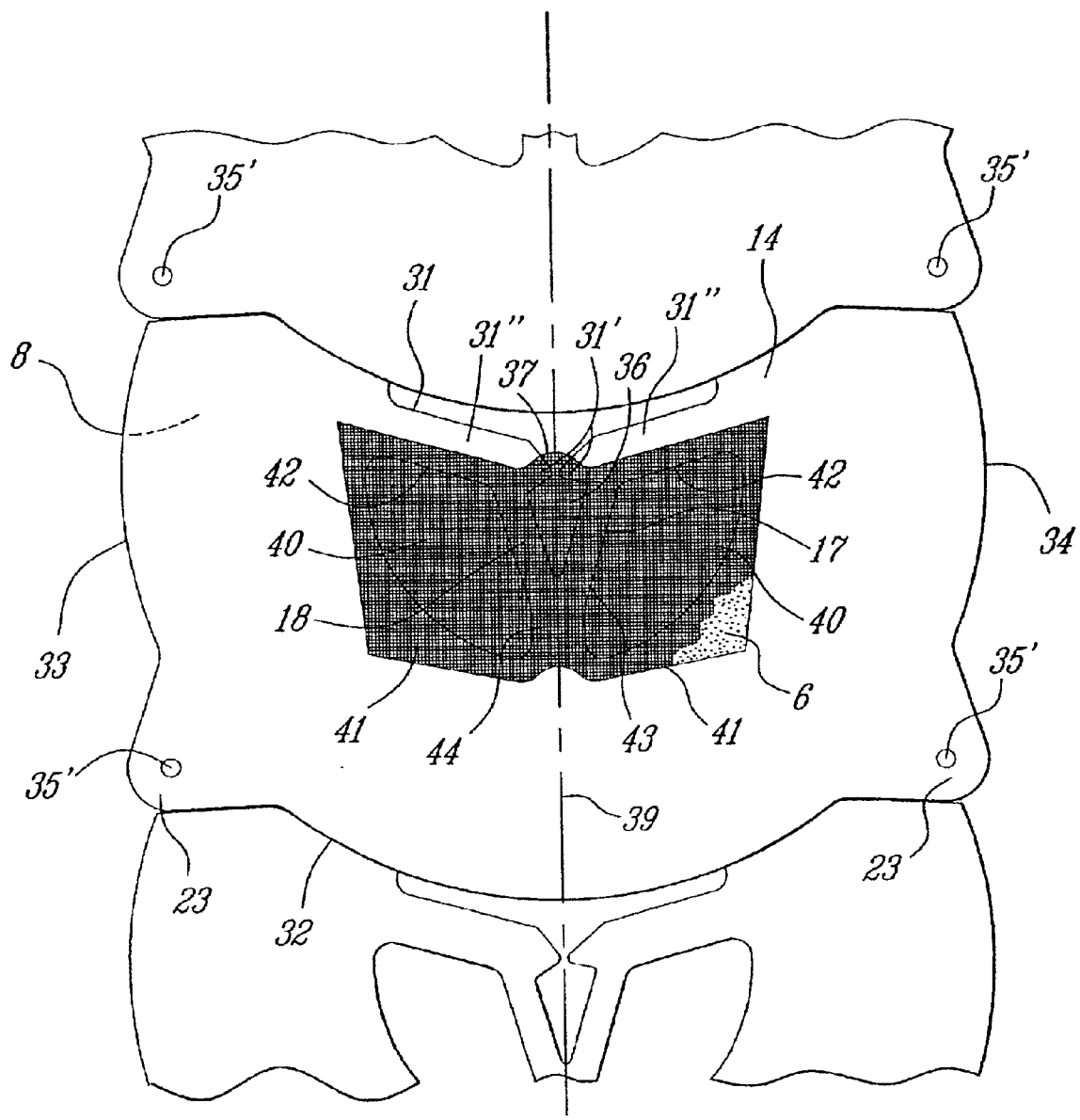
FIG. 4A is a plan view of the outer surface of the blank.

Referring now to the drawings, and more particularly to FIGS. 1 to 3, there is shown generally at 10 the cone-shaped paint strainer of the present invention. The strainer is formed from single-ply paperboard material and is shaped as an open top end cone receptacle having a conically tapering side wall 11 formed of stiff sheet material and defining an upper support portion 12 and a lower filtration portion 13. The cone strainer 10 has an outer surface 9 and an inner surface 8. Printed matter 7 may be applied to the outer surface 9 only of the strainer, whereby the ink pigments of this printed matter cannot dissolve within paint placed within the cone receptacle, whereby to contaminate the paint. The inner surface 8 of the cone receptacle is free of any such printed matter.

The lower filtration portion 13 has a first reinforcing arm 14 formed integral with the upper support portion 12 and terminates at a pointed free end 15 at the apex 20 of the receptacle. This arm 14 is a double ply of the paperboard sheet and the double ply extends to the apex. A second reinforcing arm 16 is also formed integral with the upper support portion 12 and is disposed substantially diametrically opposed to the first reinforcing arm 14. The second reinforcing arm is provided with two angulated leg portions 17 and 18, both of which are secured at a free end thereof to the first reinforcing arm 14 by a water-base glue 6 which is applied to the outer surface 9 only of the paint strainer.

The arms are disposed so as to provide enlarged filtration apertures in the conical tip of the filter. These apertures are defined by a lower filtration aperture 19 disposed between the two angulated leg portions 17 and 18, and extends to the apex 20 of the first arm 14. Further side filtration apertures 20 and 21 are provided on each side of the second reinforcing arm and defined between the outer edges 17' and 18' of the second arm, the lower edge 22 of the upper support portion 12 and the side edges 14' and 14" of the first reinforcing arm 14. A filtration mesh screen 41 is secured to the outer surface 9 of the tapering side wall 11 adjacent the apertures and to the outer surface of the reinforcing arms by a polyester glue 6, which is a water-base glue. This glue 6 is applied only on the outer surface of the conical portion and the inner surface 8 is free of any glue that could contaminate paint being strainer. The filtration mesh screen 41 extends across the filtration apertures 19, 20 and 21.

As herein shown, the reinforcing arm 14 has a pointed free end 15 which extends at its point to the apex 20, whereby adding stiffness and rigidity to the screen and the lower filtration aperture 19, where there is maximum impact when a liquid, such as paint, is poured into the filter. The screen 41 has an edge portion 41' glued between the two plies of the rib, adding further to the rigidity of the rib. The end 15 of the rib directs the fluid against the mesh of the lower filtration aperture 19. The first support arm 14 is further solidified by the two wrap-around leg portions 17 and 18 and distributes the load across the upper support portion 12. The first support arm 14 is also a flat wide reinforcing arm, which helps to direct the paint to the filtration openings and substantially reduces the stagnant time of paint within the filter, but, as pointed out hereinabove, the inner surface of the conical strainer is free of any contaminant substances such as ink or glue that could dissolve in the paint.

The non-contaminating paint strainer of the present invention is also provided with perforated ears 23 formed integral with a top edge 24 of the upper portion 12, and these are securable in the wire-like handle portion of a paint can (not shown), whereby the filter can be retained over the opening of such can.

Referring now to FIG. 4A, there is shown the blank 30 which forms the non-contaminating paint strainer of the present invention. The blank 30 comprises a flat sheet of stiff material, such as a single-ply rigid paperboard, and is defined by opposed side edges 31 and 32 and opposed symmetrical end edges 33 and 34. The edges are configured whereby the blank 30 is folded into a conical-shaped strainer, as shown in FIGS. 1 to 3, and held in position by the water-base glue 6.

The edge 32 is convex-shaped in a major central portion thereof and merges into a lower corner portion of the end edges 33 to form ears 35, provided with a perforated circle 35' to form a hole. The ears are of substantially triangular shape. The other side edge 31 is of generally concave shape and has its curvature axis extending substantially parallel to the convex-shaped curvature of the first side edge 32. The second side edge 31 has opposed ribs 31" which, when superimposed and glued together, form the reinforcing arm 14. The ribs 31' extend to a pointed protrusion 31', which is shaped to overlie the end of the pointed arm 14 and glued thereto to reinforce the arm 14 at the end.

Figure 4B:
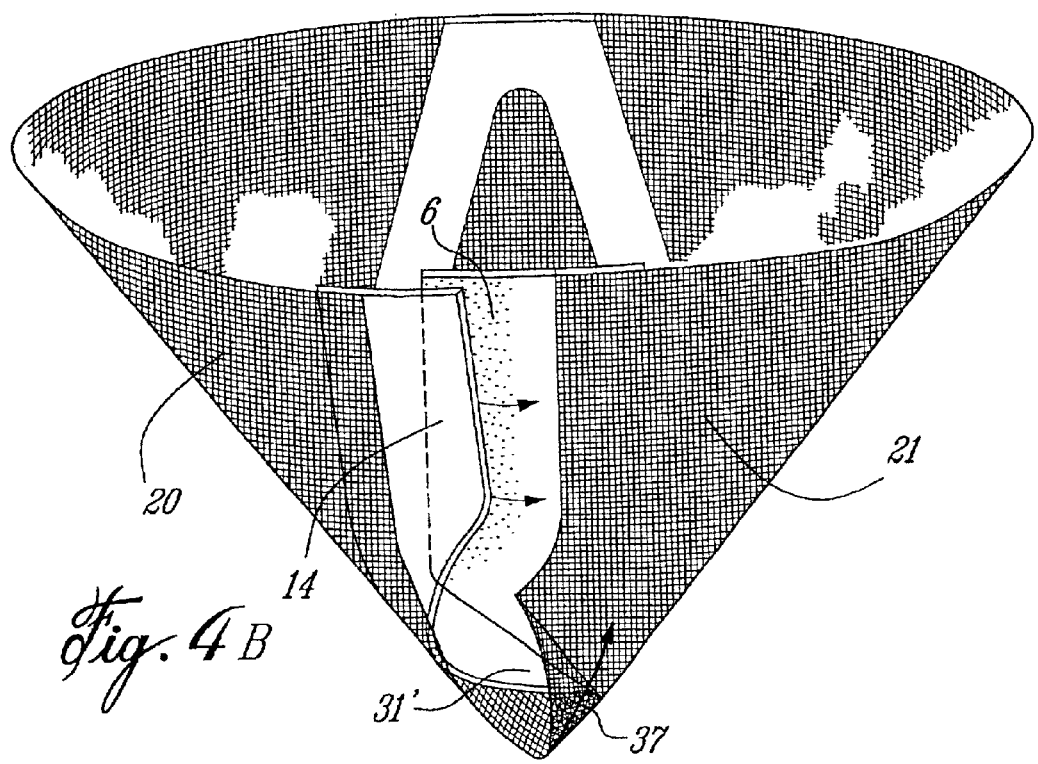
FIG. 4B is an enlarged perspective view of the conical tip section, partly open, showing the mesh fold in the cone tip.
Figure 4C:
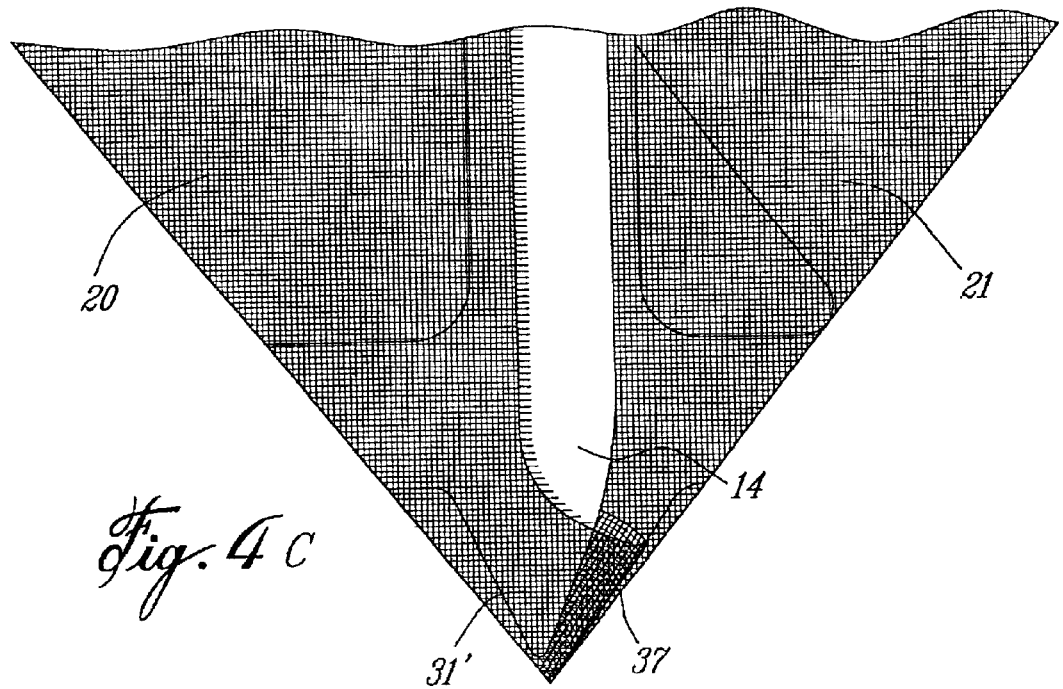
FIG. 4C is a fragmented side view of the glued cone tip.

As shown in FIGS. 4A to 4C, the mesh screen 41 has a protrusion 37 between the pointed protrusions 31' which folds upon itself and becomes captive between the protrusions 31' on another screen layer and fused thereto by the glue. This provides a very rigid cone tip which maintains its shape through its period of use when soaked with paint being filtered. It also provides stability for the large filtration apertures 20. It is also pointed out that only a single ply of mesh screen 41 is present in all apertures to ensure substantially uniform flow.

A V-shape cut-out opening 36 is centrally disposed under the protrusion 31' and the small pointed ribs 31" and merges into the sloped side edge 31. The apex 38 of one of the ribs 31" terminates on the central transverse axis 39 of the blank 30. The two large symmetrical apertures 40 are also cut out on a respective side of the V-shape cut-out opening 36 and spaced inwardly of the concave side edge 31. The filtration mesh screen 41 is secured on the outer surface 8 of the blank 30 by the water-base glue 6, which is disposed about the apertures and on the outer surface of the reinforcing ribs. A single layer of filtration mesh overlies the two large apertures 40 and a substantial portion of the V-shape cut-out opening 36, and at least covers the apex 38 of the arm 37.

The two large symmetrical apertures have a first edge 42 disposed substantially parallel to the side edge 31. A second outwardly curved edge 43 merges towards the central transverse axis 39 and is spaced inwardly thereof whereby to define between the apertures 40 a fork-shaped arm 44 therebetween constituting the reinforcing arm 16. A third curved edge 45 is outwardly disposed and bridges the extremities of the first and second edges 40 and 43, respectively. Thus, there are formed apertures 40 of substantially triangular configuration.

A first reinforcing rib 31" is defined between the edge 31 and the first edge 42 of one of the large aperture 40, and the second reinforcing rib 31" formed between the edge 42 of the other large aperture and the concave edge 31, and is adapted to be juxtaposed with the other rib 31" to form a double-ply reinforcement throughout the arm 14 when the blank is folded and glued with a screen portion therebetween to form the conical-shaped strainer illustrated in FIGS. 1 to 3.

It is also pointed out that these strainers are usually for one-time use and are usually discarded thereafter. The water-base glue utilized is a polyester glue that will not decompose or dissolve within the first 30 to 45 minutes when in contact with paint solutions when such glue is used on the outer wall of the strainer. If such glue or other type of glue is used on the inside of the strainer wherein it is in direct contact with the paint, it will slowly dissolve into the paint and contaminate the paint. This can be quite damaging to paints that have uses such as for the painting of motor vehicles, wherein repair of such paint can become very costly. This is also true of ink printing placed on the inner surface of the strainer, which is in direct contact with the paint, and only small traces of such ink pigments can affect the quality of the paint being filtered.

It is pointed out that it is the intent of the present invention to cover any obvious modifications of the example of the preferred embodiment described herein, provided such modifications fall within the interpretation of the invention as defined by the appended claims.

What is claimed is:

1. A non-contaminating paint strainer comprising a conical receptacle having a conically tapering side wall, said side wall having an inner surface and an outer surface, said conical receptacle defining an upper support portion having an open end and a lower conical filtration portion, said lower conical filtration portion having an aperture, rib reinforcing means formed integral with said side wall and extending into said aperture, a filtration mesh screen surrounds said aperture and is secured to said outer surface of said tapering side wall adjacent said aperture and to an outer surface of said rib reinforcing means by a water-base glue applied solely to said outer surface of said side wall and said outer surface of said rib reinforcing means, whereby paint being filtered by said conical receptacle will be in contact solely with said inner surface, free of said glue, said rib reinforcing means providing stress distribution and rigidity to said screen in said aperture and defining a lower conical support for said screen from a top edge of said aperture to a conical tip thereof defined by said rib reinforcing means, said lower conical support defining an apex for said receptacle and providing minimum obstruction to prevent accumulation of paint and obstruction to said mesh screen, said lower conical support comprises a first reinforcing arm having a pointed free end section terminating at said apex of said receptacle, said reinforcing arm having a wide flat reinforced body portion to guide paint towards said conical tip, said body portion being a continuous two-ply body portion having a portion of said mesh held captive between and along said two plies by said glue to constitute a reinforced arm.

2. A paint strainer as claimed in claim 1 wherein there is further provided a folded mesh section between said pointed free end sections of said two-ply body portion of said first reinforcing arm to provide a three-ply fold in said cone tip to solidify the said cone tip of the cone whereby to maintain its shape throughout its period of use when soaked paint being filtered.

3. A paint stainer as claimed in claim 1 wherein said lower conical support also comprises a second reinforcing arm which is disposed substantially diametrically opposed to said first reinforcing arm, said second reinforcing arm having two angulated leg portions, both of which are secured at a free end thereof to said first reinforcing arm and define therebetween a lower filtration aperture, said first reinforcing arm having a double ply of said stiff sheet material.

4. A paint strainer as claimed in claim 3 wherein one of said leg portions is formed integral and bridges said upper support portion and said first support arm.

5. A paint strainer as claimed in claim 1 wherein said outer surface of said conically tapering side wall is provided with ink printing, said ink printing being disposed above said lower conical filtration portion, said inner surface being free of ink printing and glue.

6. A paint strainer as claimed in claim 5 wherein said conical receptacle is formed of a single-ply sheet of paperboard material.

* * * * *